United States Patent [19]

Kálmánczhelyi

[11] Patent Number: 4,564,039

[45] Date of Patent: Jan. 14, 1986

[54] HYDRAULIC DIFFERENTIAL LOCKING DEVICE WITH ADJUSTABLE SENSITIVITY

[75] Inventor: Gábor Kálmánczhelyi, Budapest, Hungary

[73] Assignee: Danuvia Kozponti Szerszam-Es Keszulekgyar, Budapest, Hungary

[21] Appl. No.: 574,597

[22] Filed: Jan. 27, 1984

[30] Foreign Application Priority Data

Feb. 1, 1983 [HU] Hungary ............................... 326/83

[51] Int. Cl.[4] ............................................ G05D 11/03

[52] U.S. Cl. .................................................... 137/101

[58] Field of Search ................................ 137/101, 118

[56] References Cited

U.S. PATENT DOCUMENTS 2,365,095 12/1944 Miller ................................. 137/101

2,460,774 2/1949 Trautman ............................ 137/101

4,121,601 10/1978 Presley ............................... 137/101

4,402,336 9/1983 Kiss .................................... 137/101

FOREIGN PATENT DOCUMENTS 45-12190 2/1970 Japan .................................. 137/101

2070201 9/1981 United Kingdom ................ 137/118

*Primary Examiner*—Robert G. Nilson

*Attorney, Agent, or Firm*—Karl F. Ross; Herbert Dubno

[57] ABSTRACT

A hydraulic differential locking device according the invention has a changeable range of sensitivity, the regulating slide valve, being able to move even in the relieving connected position of the differential locking device, and is provided with springs ensuring the optionally selectable sensitivity of the differential locking device, the springs bearing on the two endfaces of the regulating slide valve and on the inner surface of the housing of the regulating slide valve.

1 Claim, 1 Drawing Figure

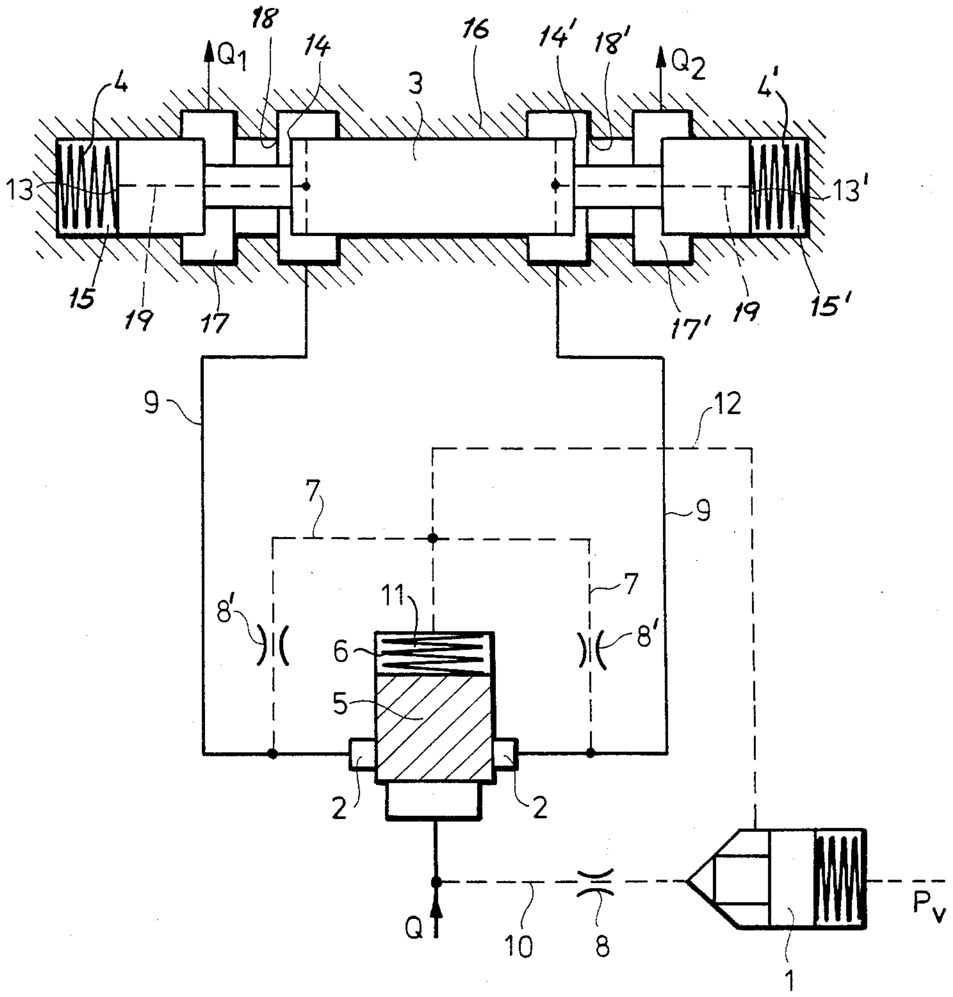
18
16
14'
18'
Q1
14
Q2
3
4
4'
13
13'
15
19
17
17'
19
15'
9
12
7
9
7
11
8'
8'
6
5
2
2
Q
10
8
1
Pv

HYDRAULIC DIFFERENTIAL LOCKING DEVICE WITH ADJUSTABLE SENSITIVITY

FIELD OF THE INVENTION

The invention relates to a hydraulic differential locking device with an adjustable range of sensitivity.

BACKGROUND OF THE INVENTION

From practice, hydraulic flow dividers, integrators and throttle regulators are known which divide the liquid flows in a predetermined ratio independent of loading, i.e. separate liquid flows are summed, so that the proportion of the velocity of labor-performing elements should have the same proportion of flow, independent of load. The versions of these structures, when provided with supplementary elements, e.g. with slide valves acting as releasable and connectable hydraulic differential locking devices, enable that at a given control signal, liquid flows could reach the driven members bypassing the regulating slide valve, without quantitative correction.

Further constructions are also known, with which elimination of regulation is performed by fixing the position of the regulating slide valve by an optional control signal, e.g. by the aid of control pistons. Compared to the previous solution, this solution has the advantage, in so far as large-sized by-pass channels become superfluous. The aforementioned solutions have the common characteristic, that liquid flows to be regulated are measured by means of constant measuring throttles or those changing in response to the liquid flow. Liquid flows passing the measuring throttles produce pressure signals, the difference of which displaces the regulating slide value if there is any, the deviation from the given ratio of division and integrating being such that cross-section of the proper pipelines are narrowed or windened until the differential pressure has ceased i.e. the desired quantitative ratio is reached.

The disadvantage of these solutions lies in that the systems work with a certain energy loss caused by the pressure drop arising in course of the travel of the liquid currents through the measuring throttles, although the systems with a changing meassuring throttle work with a more advantageous energy consumption and are able to span a wider liquid range in the course of operation.

In the case of differential locking devices, in order to reduce energy losses, in the disconnected state of the differential locking device the control signal does not only fix the basic position of the regulating slide valve but simultaneously triggers the artificial increase of the cross-section of the changing measuring throttles. In technical literature this solution is known as a relieving connection.

The operation described above can be realized with a known device which contains a small-sized controlled check-valve and a combination of permanent throttles arranged in by-pass control pipelines of small cross-section.

With drives of impellers erroneous synchronization does not result only from the difference of the required torque arising from the interaction between a wheel and the ground which can be compensated by operating the current divider functioning as a connected differential locking device, by the the artificial loads imposed by the accessory throttles, but also the tires with different pressures and diverse diameters which may be unevenly worn, and the different radii of turning, so that the equally distributed liquid flows arriving at the diversely adjusted hydromotors may cause a deviation in the number of revolutions.

As a consequence of the weight and inertia of the vehicle, a mechanical connection, i.e. wheel-ground-wheel is also established, and the synchronization error caused by a secondary factor will not appear primarly as a difference in the number of revolutions but as a control signal for positive recoupling, forwarded to the flow divider and as a consequence, by the sudden reaching of the capacity limit of the pump, the vehicle stops.

OBJECT OF THE INVENTION

The object the invention is to develop a hydaulic differential locking device which can be used for hydraulic gear drives which are suitable for establishing a disconnected state without a separate by-pass construction, its energy loss is low and which being able to span a large liquid flow, and provided with a relieving connection.

SUMMARY OF THE INVENTION

The invention is based on the recognition that if the flow divider is provided with springs of a significant spring constant acting on the ends of the regulating slide valve, that the regulating slide valve is able to begin regulation only after having sensed a pressure division error of about 10%, the hydraulic connection between the wheels will have a determining, regulating character, thus ensuring the maintenance of the differences of the number of revolutions within a given error-limit, on an energy level being in compliance with prevailing running capacity. The object can be achieved by means of a hydraulic differential locking device, which is provided with at least one slide valve with double control-edge, or with at least two regulating slide valves with a single control-edge, being of constant length, with a variable measuring throttle, and a relieving connection consisting of a controlled check-valve and permanent throttles.

In the sense of the invention the solution was further developed so, that the regulating slide valve, which is able to move even in the relieving position of the differential locking device, is provided with springs dimensioned to ensuring an optimally chosen insensitivity, which bear upon the two endfaces of the regulating slide valve and on the inner surface of the housing of the regulating slide valve.

The main advantage of the hydraulic differential locking device lies in that it guarantees protection againgst spinning of the wheels even with the hydraulic differential locking device being disconnected in hydraulic gear drives.

BRIEF DESCRIPTION OF THE DRAWING

The invention will be described in detail by means of a preferred embodiment serving as an example, by the sole FIGURE of the drawing showing the device in diagrammatic form.

SPECIFIC DESCRIPTION

According to the sole FIGURE illustrated in the drawing, the hydraulic differential locking device according to the invention comprises the regulating slide valve 3 of constant length, being provided with double control edges 14 and 14'. The slide valve is connected via the hydraulic lines 9 to the variable measuring throttles 2, which are connected to the high-pressure hydraulic supply source Q. A check valve 1 is also connected to the supply source Q via the line 10 and the fixed throttle 8 that line, the check-valve 1 being connected to the space 11 lying behind the piston of flow-divider valve 5 of the measuring throttles 2 via the line 12 and is controlled by the external control pressure $P_v$. The by-pass hydraulic lines 7 also containing fixed throttles 8' are also connected to the measuring throttles 2. At the two endfaces 13 and 13' of the regulating slide valve 3 chambers 15 and 15' are formed in the housing 16 of the regulating slide valve 3 in which the springs 4 and 4' are disposed. Valve passages 17 and 17' having control edges 18 and 18' which coact with edges 14 and 14' are also formed in housing 16, the valve passages and the chambers communicating through passageways 19 formed in slide valve 3.

The flow divider 5 with the variable measuring throttles 2 functions as a connected differential locking device when there is a pressure imbalance of about 10%, overcoming the resistance of springs 4 or 4'. When actuating the controlled check valve 1 into a closed position, the measuring throttles 2 are opened and the pressure thereon descreases, and as a consequence, differential pressure belonging to a given error, which actuates the regulating slide valves 3 against the force of the springs 4 and 4' will also decrease. That means that fixation of the regulating slide valve 3 in its basic centered position under the influence of the variable throttles 2 is not performed with the same rigidity, as with the known devices using control pistons, but it can overcome the force of the springs 4 or 4' if the pressure imbalance is sufficient.

By means of proper dimensioning of the spring 6 acting to close the slide valve 5 along with the pressure flow into space 11 of the variable measuring throttles 2 and by the proper sizing of the fixed throttles 8' in the by-pass control lines 7, it can be achieved that when check valve 1 is opened by relieving control pressure $P_v$ the regulating slide valve 3 should be returned into its basic centered position by the springs 4 of and 4'. In this case the regulating slide valve 3 ensures a maximal throughflow cross-section, as would happen with a disconnected differential locking device.

In normal operation, the hydraulic locking device acts as a hydraulic dividing and integrating device, in which the external control pressure $P_v$ acts on the check valve 1 biasing it against the high pressure from the source Q into a closed position, whereby the high pressure acts on the piston of the flow-divider valve 5, biasing it into an open position in which the high pressure can flow through the measuring throttles 2 and the hydraulic lines 9 into the respective valve passages 17 and 17' and from there to the respective hydraulic loads $Q_1$ and $Q_2$ and the respective chambers 15 and 15' via respective passageways 19 and 19'. As long as the loads $Q_1$ and $Q_2$ remain equal or do not exceed a pressure imbalance of 10%, the resistance of springs 4 and 4' will not be overcome and the regulating valve 3 will remain centered in the housing 16 with equal spacing of the control edges 14 and 18 and 14' and 18' respectively. However, for instance, if the load $Q_1$ increased beyond 10% of load $Q_2$, the pressure in valve passage 17 would increase and cause a subsequent increase of pressure in chamber 15, which would act on the endface 13 to drive the regulating valve 3 toward the right, as viewed in the FIGURE, increasing the spacing between control edges 14 and 18 and decreasing or closing the spacing between control edges 14' and 18', whereby the high pressure flow to the load $Q_1$ would increase, where it is needed. Conversely, if the load $Q_2$ were to increase, the opposite operations to those described for an increase on load $Q_1$ would occur.

When it is desired to operate the device as a differential lock only, the control pressure $P_v$ is lowered and the high pressure in hydraulic line 10 opens the check valve 1 and flows through the hydraulic line 12 into the space 11, where the high pressure plus the spring 6 drives the piston of the flow divider 5 into a closed position, blocking measuring throttles 2, so that the high pressure flows through the hydraulic lines 7 and fixed throttles 8', where the high pressure is reduced to a level which can not overcome entirely the force of springs 4 or 4', so that even a total imbalance of loads $Q_1$ and $Q_2$ would not cause the regulating valve 3 to shift into a fully flow-blocking position but would cause the valve 3 to be displaced to some extent, whereby power would always be delivered to both loads $Q_1$, $Q_2$, with more power going to the greater load.

Comparison of wheel-velocities shows that slide valve throttling begins only if the value of velocity error is above about 30%. With such an insensitivity turning of a vehicle with a small radius becomes possible, while simultaneously the wheels are protected against spinning.

I claim:

1. A hydraulic differential locking device comprising:

a housing;

a slide valve displaceable in said hosing and formed with first and second control edges;

first and second valve passages formed in said housing and connected to respective first and second hydraulic loads, said first valve passage being formed with a third control edge juxtaposed with said first control edge and said second valve passage being formed with a fourth control edge juxtaposed with said second control edge, whereby displacement of said slide valve varies oppositely the respective spacings between said first and said third control edges and between said second and said fourth control edges;

first and second chambers in said housing, each chamber formed at a respective endface of said slide valve, said slide valve being formed with a first passageway communicating between said first valve passage and said first chamber and a second passageway communicating between said second valve passage and said second chamber, said first and second chambers each being provided with a respective spring disposed therein and acting on the respective endface of said slide valve biasing same into a centered position wherein the spacings are equal;

a primary hydraulic circuit connecting said first and second valve passages with a high-pressure hydraulic source for feeding a pressure flow to said first and second hydraulic loads, said primary circuit being provided with a flow-splitting variable throttle valve between said high pressure source and said first and second valve passages and having a first spring-loaded member acting against said high pressure source, whereby when the forces acting on said first and second hydraulic loads are equal the pressures in said first valve passage and the first chamber and said second valve passage and said second chamber are in equilibrium and said slide valve remains in a centered position and the pressure flow through said first and second valve passages is equal and when the forces acting on said first and second hydraulic loads is unequal the respective pressures become unequal, whereby when the inequality of the respective pressures is sufficient to overcome the resistance of a respective spring, said slide valve is displaced and the spacings become unequal, so that the pressure flow through said first and second valve passages becomes unequal; and a secondary hydraulic circuit connecting said first and second valve passages and said first spring-loaded member with said high-pressure hydraulic source, said secondary circuit being provided with a check valve between said first and second valve passages and said first member and said pressure source and having a second spring-loaded member acting against said high pressure source and held in a flow closing position by an external control pressure, with at least one fixed throttle valve between said high pressure source and said check valve and at least one fixed throttle valve each between said first valve passage and said check valve and between said second valve passage and said check valve, whereby upon the removal of said external control pressure, the pressure flow from said high pressure source acts on said second member to open same and allow the pressure flow to act on said first member to close said variable throttle valve, whereby the pressure from said source can flow through the fixed throttle valves to said first and second valve passages, said springs being dimensioned to maintain said slide valve centered until the imbalance of pressure reaches about 10%.

* * * * *